United States Patent [19]

Hara et al.

[11] Patent Number: 5,593,631
[45] Date of Patent: Jan. 14, 1997

[54] METHOD FOR MOLDING RESIN ARTICLES

[75] Inventors: Takahisa Hara, Toyonaka; Masahito Matsumoto, Ibaraki; Nobuhiro Usui, Takatsuki, all of Japan

[73] Assignee: Sumitomo Chemical Company, Limited, Osaka, Japan

[21] Appl. No.: 369,256

[22] Filed: Jan. 5, 1995

Related U.S. Application Data

[60] Continuation of Ser. No. 873,885, Apr. 24, 1992, abandoned, which is a division of Ser. No. 545,566, Aug. 29, 1990, abandoned.

[30]    Foreign Application Priority Data

Jun. 30, 1989   [JP]   Japan ................................ 1-170811

[51] Int. Cl.⁶ ................................................. B29C 43/20
[52] U.S. Cl. ........................ 264/257; 264/259; 264/265; 264/266; 425/112; 425/116; 425/125; 425/395
[58] Field of Search ........................ 264/257, 255, 264/259, 265, 266, DIG. 65; 425/112, 116, 117, 125, 128, 388, 345, 408, 410, 415, 423, 412

[56]    References Cited

U.S. PATENT DOCUMENTS

| | | | |
|---|---|---|---|
| 2,744,340 | 5/1956 | Gerber | 264/257 |
| 2,797,179 | 6/1957 | Reynolds et al. | 264/257 |
| 2,959,511 | 11/1960 | Finger | 264/257 |
| 3,654,062 | 4/1972 | Loew | 264/259 |
| 3,790,432 | 2/1974 | Fletcher et al. | 264/257 |
| 3,932,252 | 1/1976 | Woods | 264/46.4 |
| 3,943,215 | 3/1976 | Grüne et al. | 264/257 |

(List continued on next page.)

FOREIGN PATENT DOCUMENTS

| | | |
|---|---|---|
| 0186015 | 7/1986 | European Pat. Off. . |
| 0305969 | 10/1989 | European Pat. Off. . |
| 833118 | 3/1952 | Germany . |
| 53-145872 | 12/1978 | Japan ........................ 425/423 |
| 62-181112 | 8/1987 | Japan ........................ 264/257 |
| 62-179909 | 8/1987 | Japan ........................ 264/266 |

OTHER PUBLICATIONS

Design of Plastic Moulds and Dies, by Laszlo Sors and Imre Balazs, from "Studies in Polymer Science", vol. 3, p. 17, 1989.

"Duroplaste", Kunststoff Handbuch 10, by Professor Dr. Wilbrand Woebcken, p. 301. no date.

"Plastics Engineering", vol. XL No 10, Oct. 1984, pp. 36 and 37.

Primary Examiner—Jay H. Woo
Assistant Examiner—Duane S. Smith
Attorney, Agent, or Firm—Birch, Stewart, Kolasch & Birch, LLP

[57]    ABSTRACT

A method for producing a multilayer molded article that includes a resin body and a skin material on a surface of the resin body, which method uses a mold having male and female molds. The shortest horizontal distance of a mating gap between the horizontally outermost wall surface of the male mold to which the skin material contacts and the horizontally innermost wall surface of the female mold to which the skin material contacts is 0.25 to 3 times the minimum thickness from which the once compressed skin material can restore the original thickness. The shortest length L in a mold closing direction of a mated part formed between the outermost wall of the male mold to which the resin melt contacts and the innermost wall of of a flange of the female mold satisfies the equation:

$$(t_1 - t_0 + 10) mm \geq L \geq (t_0 - t_0) mm$$

wherein $t_1$ is a distance (mm) between the male and female molds when the resin melt first reaches the horizontally outermost edge of the male mold, and $t_0$ is a distance (mm) in the mold closing direction between the same points on the male and female molds as those used for measuring $t_1$ when the mold closing is completed. In this method, squeeze-out of a resin melt during molding is prevented, and a multilayer molded article having no blanching, breakage or wrinkle of a skin material is produced.

10 Claims, 4 Drawing Sheets

FIG. 3F

U.S. PATENT DOCUMENTS

| | | | |
|---|---|---|---|
| 4,075,266 | 2/1978 | Theyson | 264/259 |
| 4,089,919 | 5/1978 | Sanson | 264/259 |
| 4,260,576 | 4/1981 | Pollard | 264/259 |
| 4,580,962 | 4/1986 | Haas | 425/125 |
| 4,707,317 | 11/1987 | Epel et al. | 264/257 |
| 4,734,147 | 3/1988 | Moore | 264/257 |
| 4,734,230 | 3/1988 | Rhodes, Jr. et al. | 264/46.5 |
| 4,755,120 | 7/1988 | Onnenberg et al. | 264/257 |
| 4,824,070 | 4/1989 | Mizuno et al. | 264/257 |
| 4,873,041 | 10/1989 | Masui et al. | 264/257 |
| 4,932,857 | 6/1990 | Nishino et al. | 425/395 |
| 4,952,130 | 8/1990 | Reil | 425/125 |
| 4,968,465 | 11/1990 | Rhodes, Jr. | 264/46.5 |
| 4,983,247 | 1/1991 | Kim | 264/257 |
| 4,986,948 | 1/1991 | Komiya et al. | 264/257 |
| 5,053,179 | 10/1991 | Masui et al. | 264/257 |
| 5,122,320 | 6/1992 | Masui et al. | 264/257 |
| 5,154,872 | 10/1992 | Masui et al. | 264/266 |

METHOD FOR MOLDING RESIN ARTICLES

This application is a continuation, of application of Ser. No. 07/873,885 filed on Apr. 24, 1992, now abandoned, which a Rule 62 Divisional of Ser. No. 07/545,566 filed on Jun. 29, 1990, now abandoned.

BACKGROUND OF THE INVENTION

The present invention relates to a method for molding a multilayer molded article. More particularly, the present invention relates to a method for producing a multilayer molded article, which method can produce a molded resin article having a skin material while preventing squeeze-out of a resin melt during molding and providing a molded article with no blanching, breakage of wrinkle of the skin material.

2. Description of the Related Art

Resin molded articles are widely used in many products including automobiles and household electric appliances, since such molded articles are economical and light and have good moldability.

Since resin molded articles have some draw-backs such that they have a poor appearance or a cool feeling and are easily flawed, it is desired to provide resin molded articles having good surface properties such as decorations and soft feeling.

Although many attempts have been made to provide desirable resin molded articles, it is impossible for a single resin to have satisfactory moldability and strength and also provide a molded article having good surface properties.

Presently, at least two materials having different functions are combined in a composite to produce a multilayer molded article comprising a resin body and a skin material.

As a method for producing the multilayer molded article, there is proposed a method comprising providing a resin melt and the skin material in a cavity formed in a mold which consists of male and female molds and closing the male and female molds whereby the molding of the resin and covering with the skin material are simultaneously done.

However, in this method, as shown in FIG. 1A, a part of a skin material 21 provided on a resin body 25 is strongly pulled during molding to cause blanching (22) or wrinkles (23) and in some case, said part is broken (24).

In addition, before the closing of the male and female is completed, a quantity of resin melt is squeezed out from an edge of the article to provide a molded article with a deformed shape as shown in FIG. 1B. Further, as shown in FIG. 1C, an edge part of the skin material 21 is broken and a part of the skin material 21 is peeled off to expose the resin body. Such articles have no commercial value.

SUMMARY OF THE INVENTION

One object of the present invention is to provide a method for producing a multilayer molded article, which method can prevent squeeze-out of a resin melt during molding.

Another object of the present invention is to provide a method for producing a multilayer molded article having no blanching, breakage or wrinkles of the skin material laminated on the resin body.

Accordingly in the present invention there is provided a mold for producing a multilayer molded article comprising a resin body and a skin material on a surface of the resin body, which mold consists of male and female molds, wherein the horizontal distance of a mating gap between the vertical wall surface of the male mold to which the skin material contacts and the vertical wall surface of the female mold to which the skin material contacts is 0.25 to 3 times the minimum thickness from which the once compressed skin material can restore the original thickness, and the length L in a mold closing direction of a mated part formed between the outermost wall of the male mold to which the resin melt contacts and the innermost wall of of a flange of the female mold satisfies the equation:

$$(t_1-t_0+10)\text{mm} \geqq L \geqq (t_1-t_0)\text{mm}$$

wherein $t_1$ is a distance (mm) between the male and female molds when the resin melt first reaches the horizontally outermost edge of the male mold, and $t_0$ is a distance (mm) in the mold closing direction between the same points on the male and female molds as those used for measuring $t_1$ when the mold closing is completed.

Herein, the wording "minimum thickness from which the once compressed skin material can restore the original thickness" is intended to mean a thickness of the skin material compressed under the maximum force, the skin material compressed under which force can restore to its original thickness. Such minimum thickness varies with the material and thickness of the skin material.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE DRAWINGS

Now, the present invention will be explained by making reference to the accompanying drawings.

Figure 1A:
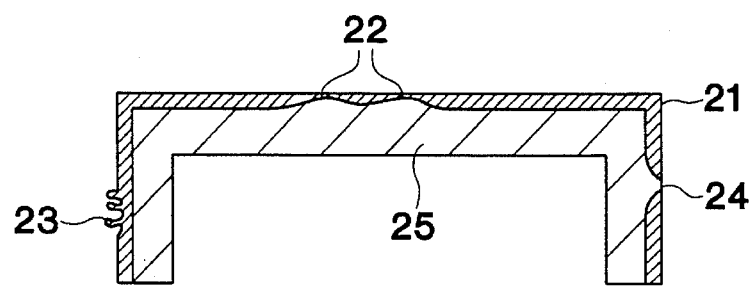
FIGS. 1A, 1B and 1C show conventional multilayer molded articles having defects.
Figure 1B:
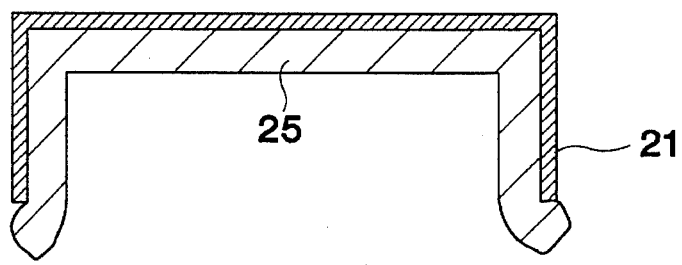
Figure 1C:
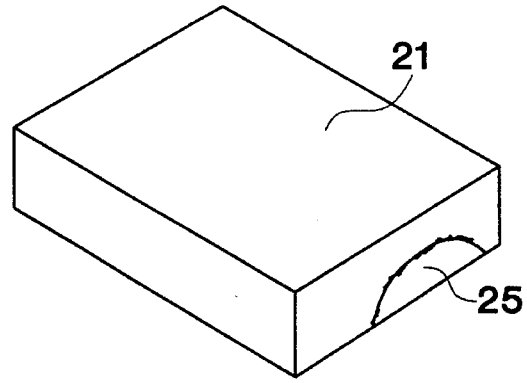
Figure 3E:
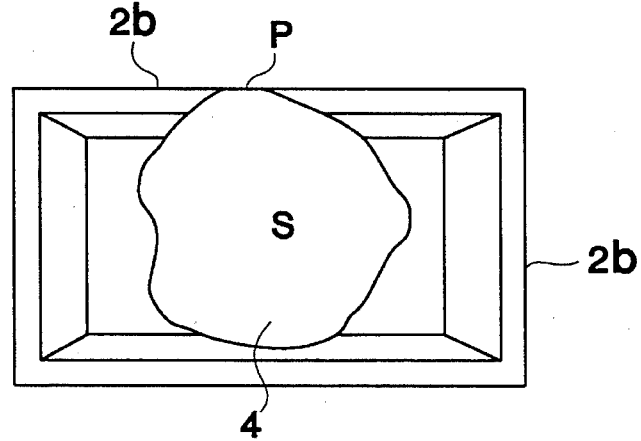
Figure 2:
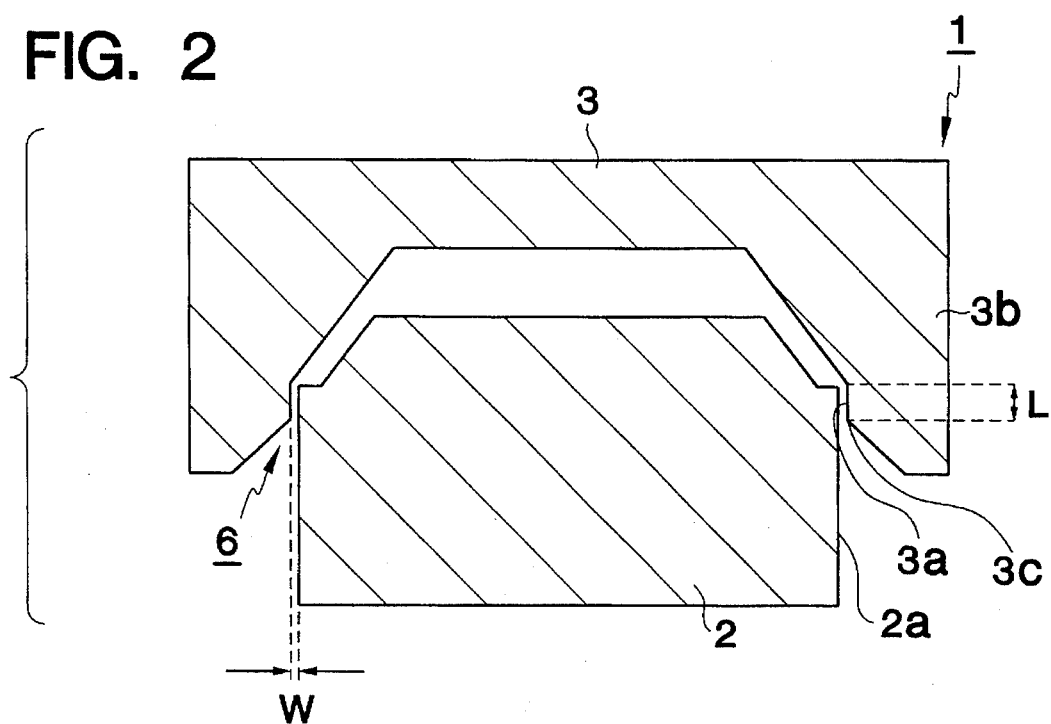
FIG. 2 is a cross sectional view of one embodiment of the mold according to the present invention, FIGS. 3A, 3B, 3C, 3D, 3E and 3F schematically show steps for producing a multilayer molded article with the mold according to the present invention.

FIG. 2 is a cross sectional view of one embodiment of the mold according to the present invention when the mold closing is completed.

The mold 1 comprises a male mold 2 and a female mold 3 which mates with the male mold 2.

In this embodiment, the male mold 2 is fixed and the female mold 3 is moved vertically with a well known lifting mechanism (not shown). The male mold 2 directly contacts to the resin melt, and the female mold 3 directly contacts to the skin material.

When the mold closing is completed, the shortest horizontal distance (W) in the mating gap 6 between the vertical wall surface 2a of the male mold 2 to which the skin material contacts and the vertical wall surface 3a of the female mold 3 to which the skin material contacts is 0.25 to 3 times, preferably 0.5 to 1.5 times the minimum thickness from which the once compressed skin material can restore its original thickness.

The minimum thickness of the skin material from which the once compressed skin material can restore its original thickness is defined above and varies with the kind and original thickness of the skin material. For example, in case of a skin material consisting of a polyvinyl chloride sheet and a polypropylene foam, the skin material can restore the original thickness when it is compressed to a thickness of one fifth of the original thickness. But, since a metal sheet is hardly compressed, its original thickness is substantially equal to such minimum thickness.

The reason why the horizontal distance (W) in the mating gap 6 is adjusted to 0.25 to 3 times the minimum thickness from which the once compressed skin material can restore the original thickness is that, when said distance (W) is smaller than 0.25 times said minimum thickness of the skin material, the skin material tends to be broken before the completion of mold closing, or the skin material may be blanched or wrinkled, while when said distance (W) is larger than 3 times said minimum thickness, the gap between the male and female molds is so large that the resin melt may be squeezed out.

In addition, in the present invention, the mating length L in the mold closing direction of the mated part formed between the vertical wall of the male mold to which the resin melt contacts and the vertical wall of the female mold at the completion of press molding satisfies the equation:

$$(t_1-t_0+10)mm \geq L \geq (t_1-t_0)mm$$

wherein $t_1$ and $t_0$ are the same as defined above.

The reason why the mating length L in the mold closing direction at the time of completion of the press molding is adjusted in the above range is that, when the length L is longer than the above upper limit, the skin material is partly strongly pulled so that the skin material tends to be blanched or broken in an extreme case, while when said length L is shorter than the above lower limit, the resin melt tends to be squeezed out so that the defect molded article may be produced.

The mating length of the mated part in the molding direction is not necessarily uniform around the whole circumference of the mold. At least at a point P of the mating edge of the male mold to which the resin melt first reaches, the mating length L of the mated part should satisfy the above equation. At other points, the length of the mated part may be from zero to L.

Figure 3A:
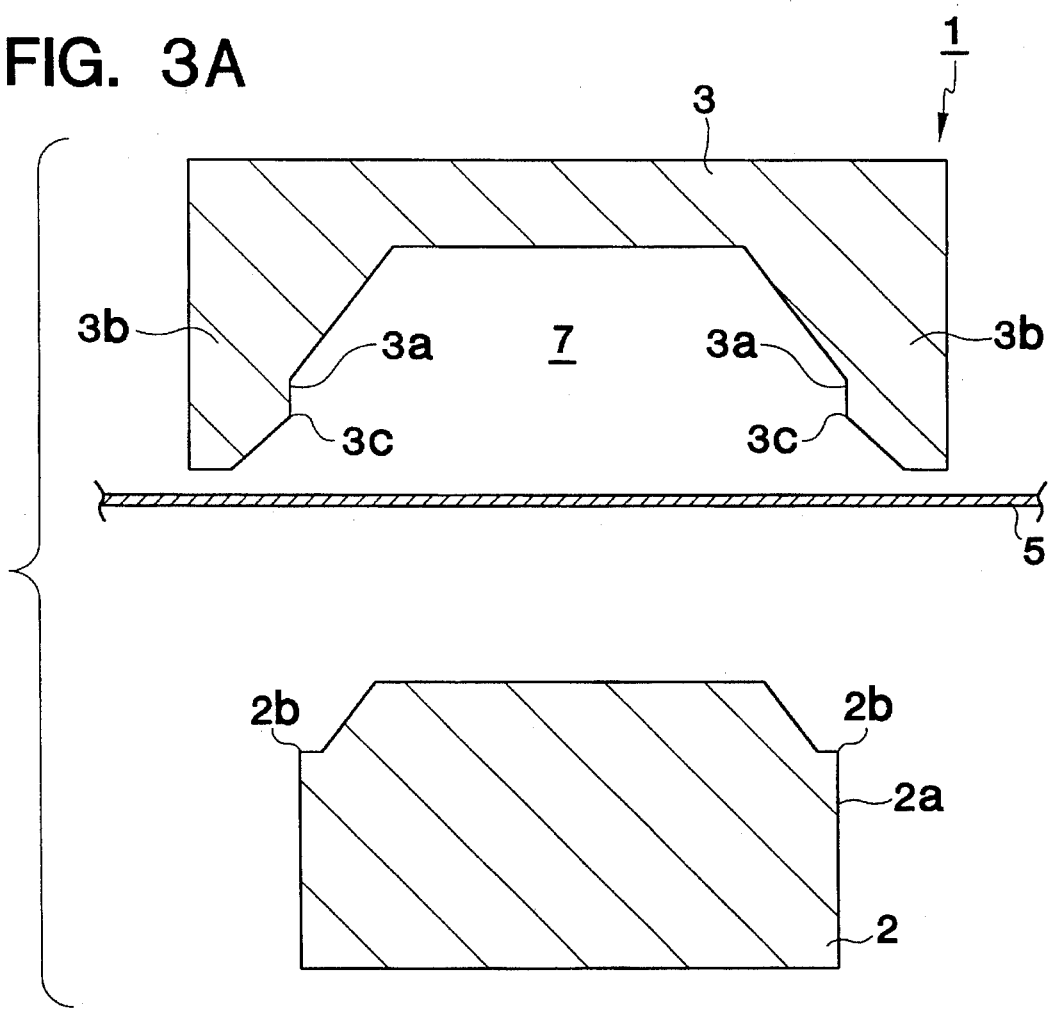

With the mold according to the present invention, the multilayer molded article can be produced by the following steps:

1. First, the skin material 5 is supplied between the male mold 2 and the female mold 3 (see FIG. 3A).

Figure 3B:
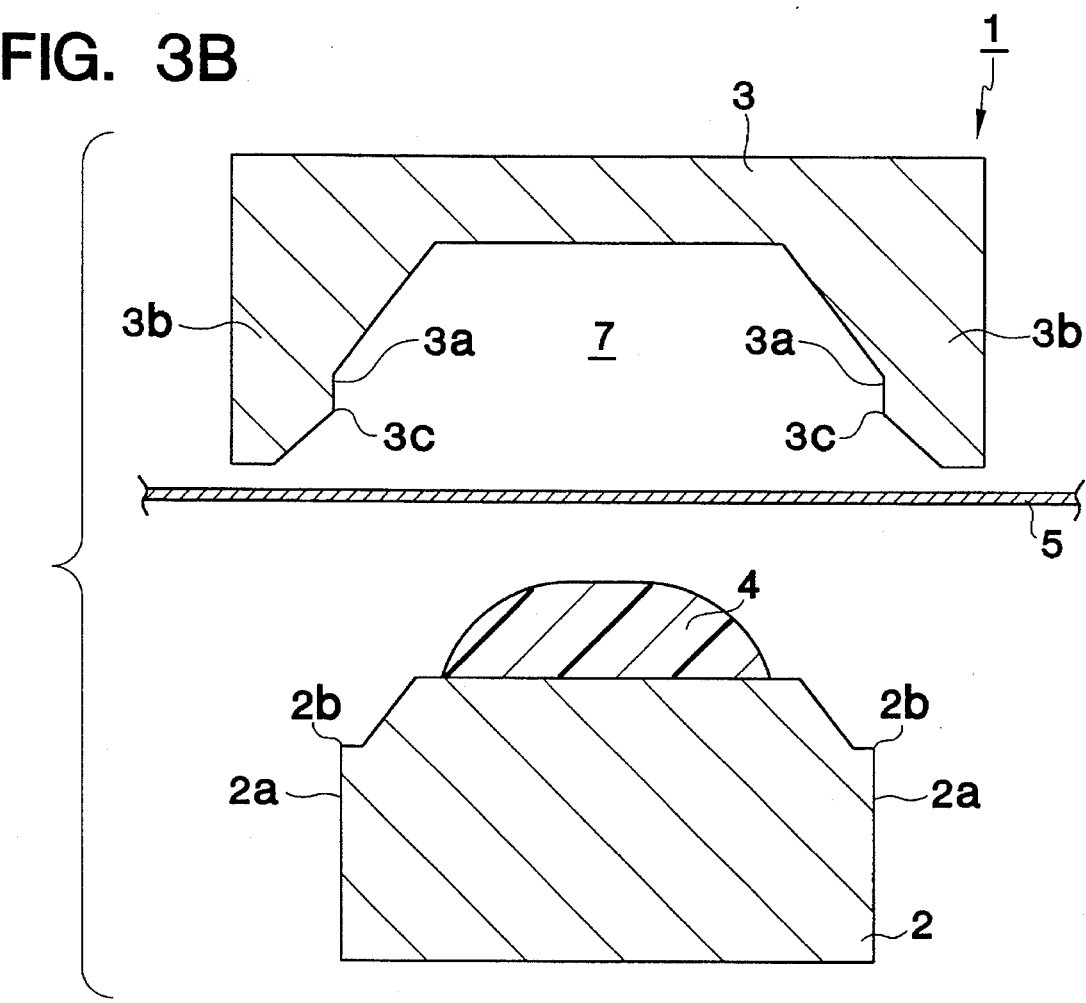

2. Between the male mold 2 and the female mold 3, a mass of resin melt 4 is supplied. In FIG. 3B, the mass of resin melt is supplied on the male mold 2 below the skin material 5.

The resin melt can be supplied by a per se conventional means. For example, the resin melt is supplied through a resin supplying conduit which is formed in the mold (not shown) with means for melting and plasticizing the resin such as an extruder (not shown).

Figure 3C:
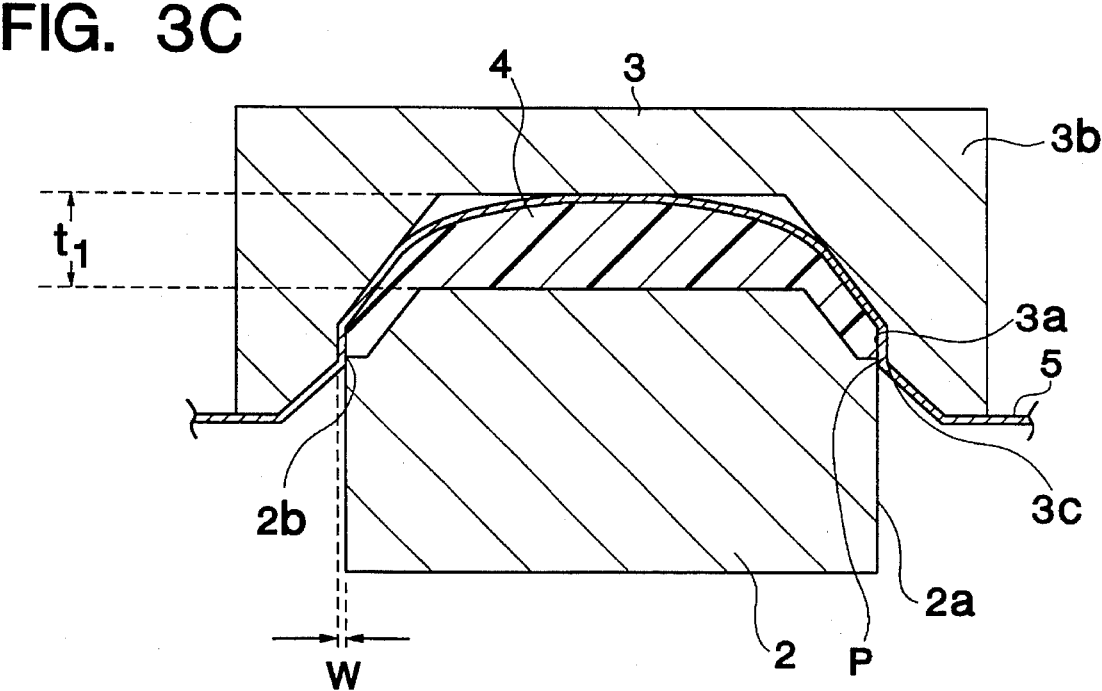

3. By actuating the lifting mechanism, the female mold is lowered to press the skin material and then the resin melt, whereby the resin melt flows and spreads between the skin material 5 and the surface of the male mold 2. Simultaneously, the skin material is pressed against the inner wall of the female mold. (see FIG. 3C).

Figure 3D:
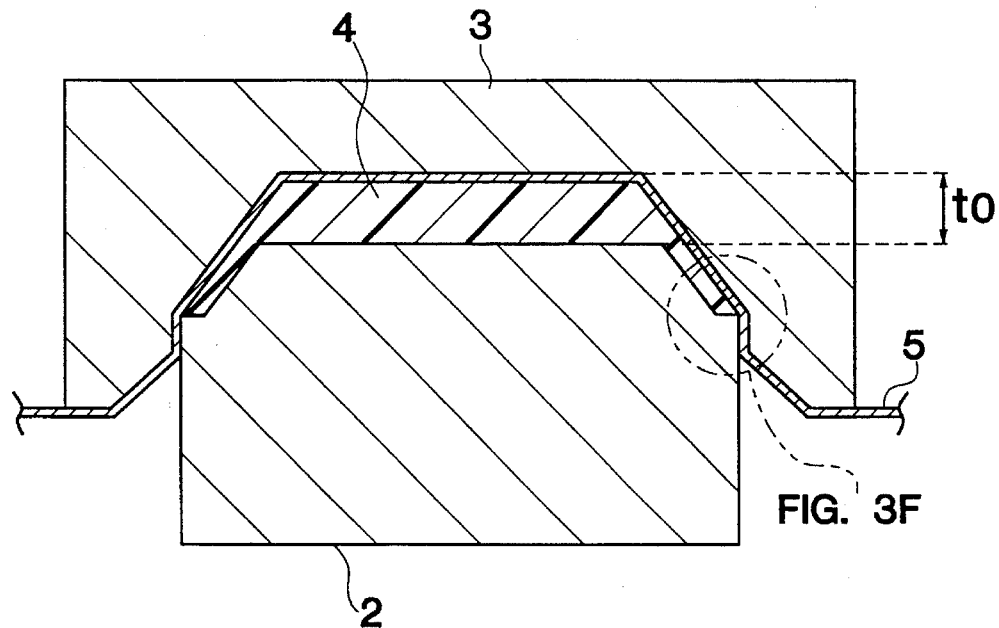
Figure 3F:
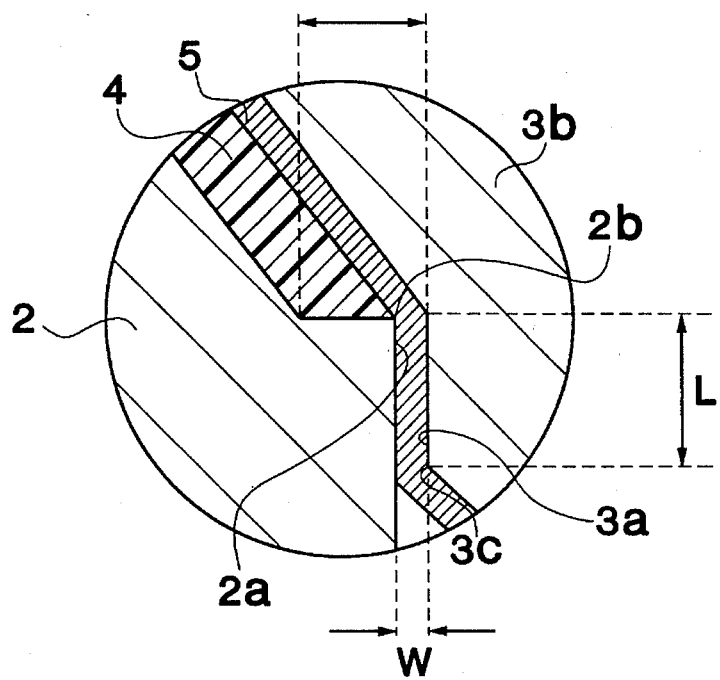

4. The female mold is further lowered, and finally, the male and female molds are completely closed to complete the molding of resin (see FIG. 3D). Thereby, a multilayer resin molded article comprising the resin body and the skin material is produced. Since the horizontal distance (W) and the mating length (L) of the mated part are in the above ranges defined by the present invention, the skin material 5 is not broken, or the part of the skin material 5 near the edges of the article is not blanched or wrinkled (see FIG. 3F, an enlarged view of a portion of FIG. 3D).

In the molding process, the timing of the resin melt supply is not limited to the above described timing. The resin melt can be supplied at any time before the male and female molds are completely closed.

The resin melt can be supplied between the skin material and either of the male and female molds. Therefore, the present invention can be applied for inner lining and outer lining.

The relative position of the male and female molds and the closing direction can be freely selected.

Specific examples of the skin material are woven or non-woven fabric, nets made of metals, fibers or thermoplastic resins, paper, metal foils, and a sheet or a film of a thermoplastic resin or elastomer. The skin material may be decorated with uneven patterns such as grain patterns, printing, dying and the like. In addition, the skin material may be made of foamed materials of thermoplastic resins or rubbers. Also, a laminate comprising at least two layers each made of the same material or different materials which are bonded to each other with an adhesive can be used as the skin material. Before the skin material is supplied in the mold, a part or whole of the skin material may be preheated to adjust tensile stress and elongation.

As the resin to be molded with the mold of the present invention, any of the conventional resins used in compression molding, injection molding and extrusion molding can be used. Specific examples of the resin are non-expandable or expandable resins of thermoplastic resins (e.g. polypropylene, polyethylene, polystyrene, acrylonitrile-styrene-butadiene copolymer, nylon, etc.), and thermoplastic elastomers (e.g. ethylene-propylene block copolymer, styrene-butadiene block copolymer, etc.). The resin may contain at least one additive such as fillers (e.g. inorganic fillers and glass fibers), pigments, lubricants, antistatic agents and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for molding resin articles comprising the steps of:

providing opposing male and female mold portions, the mold portions being movable between open and closed states;

forming an annular mating gap (W) between the male and female mold portions in the closed state, the annular mating gap (W) being formed by a flange on said female mold portion which overhangs sidewalls of said male mold portion by a distance (L) in a mold closing direction forming a mating edge therewith;

providing the distance (L) to satisfy the equation $$(t_1-t_0+10)mm \geq L \geq (t_1-t_0)mm,$$

wherein:

$t_1$ is a distance (mm) in the mold closing direction between the male and female mold portions when the resin material first reaches the mating edge of the male mold portion, and $t_O$ is a distance (mm) in the mold closing direction between the same points on the male and female portions as those used for measuring $t_1$, when the mold closing is complete;

making the width of the mating gap (W) between the male and female mold portions from 0.25 to 3 times a minimum thickness from which a compressed skin material can return to the original thickness thereof;

placing skin material between the mold portions while the mold portions are in the open state;

supplying a resin material between the mold portions in the open state;

moving the mold portions toward one another from the open state to the closed state;

pressing the skin material against the resin material during the step of moving; and stopping movement of the mold portions when the mold portions reach the closed state.

2. The method for molding resin articles according to claim 1, further comprising the step of providing a shortest horizontal distance of the mating gap from 0.5 to 1.5 times the minimum thickness from which the compressed skin material can return to the original thickness thereof.

3. The method for molding resin articles according to claim 1, wherein the step of supplying places the resin material between the skin material and the male mold portion.

4. The method for molding resin article according to claim 1, wherein the step of moving comprises lowering the female mold portion toward the male mold portion.

5. The method for molding resin articles according to claim 1, wherein the step of supplying the resin material occurs after the step of moving the mold portions has begun but before the male and female mold portions reach the closed state.

6. The method for molding resin articles according to claim 1, wherein the skin material comprises a material selected from the group consisting of woven fabric, non-woven fabric, metal foils, a sheet of thermoplastic resin, a film of thermoplastic resin, and a laminate sheet.

7. The method for molding resin articles according to claim 1, further comprising the step of preheating at least a portion of the skin material before the step of placing the skin material between the mold portions in order to adjust tensile stress and elongation of the skin material.

8. The method for molding resin articles according to claim 1, further comprising the step of providing at least one additive to the resin material, the additive being selected from the group consisting of fillers, pigments, lubricants and antistatic agents.

9. The method for molding resin articles according to claim 1, wherein the skin material comprises a material selected from the group consisting of a net made of fibers, paper, a thermoplastic elastomer sheet, a thermoplastic elastomer film, a foamed materials sheet and a rubber sheet.

10. The method for molding resin articles according to claim 9, wherein the net of fibers is selected from the group consisting of a net made of metal and a net made of thermoplastic resins.

* * * * *